Figures 1, 2, 3, 4:
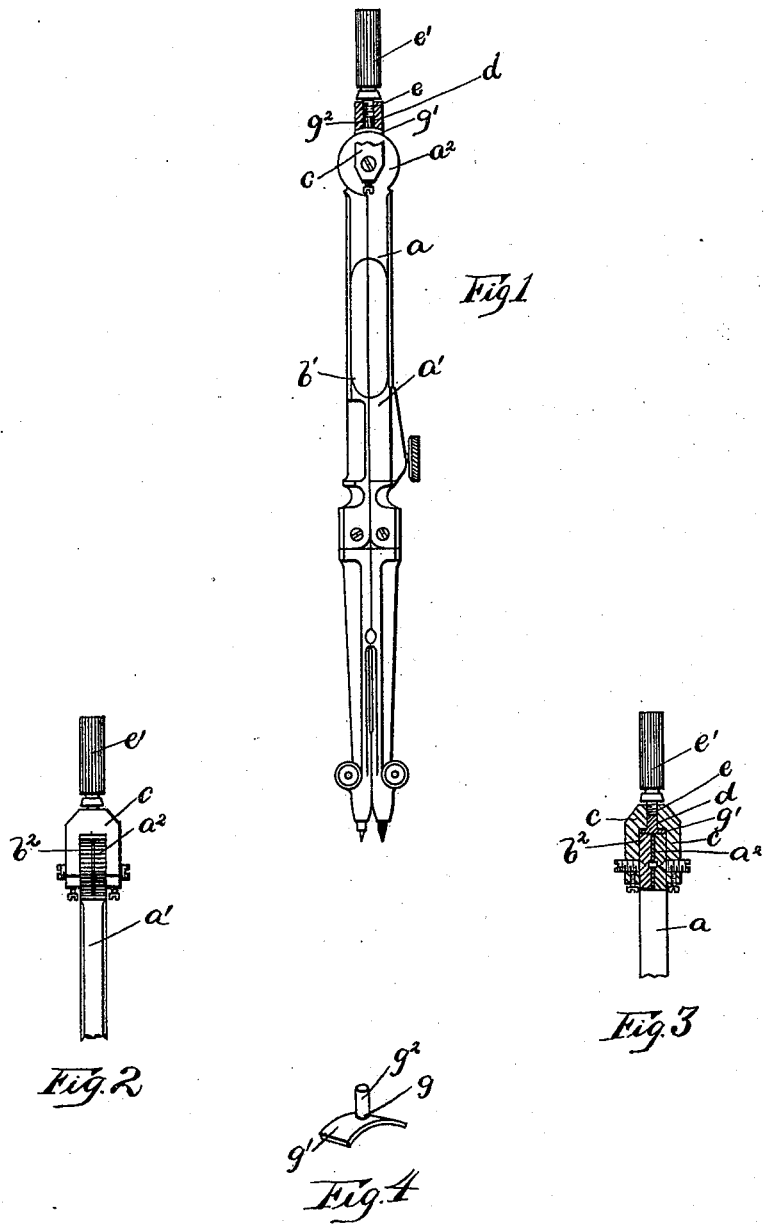

(No Model.)

H. COLE.
DRAWING INSTRUMENT.

No. 530,680. Patented Dec. 11, 1894.

WITNESSES:
H. B. Bradshaw
A. L. Phelps

INVENTOR
Harrison Cole
BY
Staley and Shepherd
ATTORNEYS.

UNITED STATES PATENT OFFICE.

HARRISON COLE, OF COLUMBUS, OHIO.

DRAWING-INSTRUMENT.

SPECIFICATION forming part of Letters Patent No. 530,680, dated December 11, 1894.

Application filed April 16, 1894. Serial No. 507,679. (No model.)

*To all whom it may concern:*

Be it known that I, HARRISON COLE, a citizen of the United States, residing at Columbus, in the county of Franklin and State of Ohio, have invented a certain new and useful Improvement in Drawing-Instruments, of which the following is a specification.

My invention relates to drawing instruments and has particular relation to engineers' and draftsmens' compasses.

The objects of my invention are to provide compasses, dividers or similar instruments of this class with simple and reliable means for retaining the arms thereof at any desired angle or degree of separation; to admit of compasses or similar instruments of the ordinary construction being readily provided with my brake or retaining attachment and produce other improvements in details of construction which will be more fully pointed out hereinafter. These objects I accomplish in the manner illustrated in the accompanying drawings, in which—

Figure 1 is a view in elevation of a compass having my improvement thereon and for the sake of clearness showing a portion of the handle yoke in section. Fig. 2 is a view in elevation of the upper portion of the compass taken at right angles with the view shown in Fig. 1. Fig. 3 is a central vertical section of the upper portion of said compass and Fig. 4 is a detail view in perspective of the brake shoe or retainer which I employ in carrying out my invention.

Similar letters refer to similar parts throughout the several views.

$a$ represents an ordinary form of compass, the arms $a'$ and $b'$ of which form at their upper ends the usual hinge disks $a^2$ $b^2$, said hinge disks being fulcrumed or jointedly connected together in any desired or well known manner.

$c$ represents the usual handle yoke which is of the general inverted U shape and the arms of which embrace the outer faces of the joint or hinge disks $a^2$ $b^2$, with which said yoke arms are pivotally connected. Formed centrally through the head or upper end of the yoke $c$ is the usual internally threaded opening $d$ into the upper end of which is adapted to be screwed in the usual manner the screw threaded stem portion $e$ of the ordinary finger piece $e'$.

$g$ represents my improved brake shoe which, as indicated in the drawings, consists of a short curved or concaved plate or shoe $g'$ from the upper side and center of which extends upwardly a short stud or pin $g^2$ which is formed or rigidly connected with said shoe.

In the formation of the ordinary compasses, it is well known that a slight space is left between the under side of the yoke head and the upper sides of the arm hinge disks. This space I utilize by fitting loosely therein the correspondingly shaped brake shoe $g'$ allowing said stem $g^2$ to project upward within the opening $d$ of said yoke head a sufficient distance to meet and receive a downward pressure from the lower end of the partially inserted stem $e$ of the finger piece $e'$.

The operation and manner of utilizing my invention is substantially as follows: The compass arms having been separated or made to diverge to such distance as may be necessary for the production of the desired circle, said arms may be rigidly located in such position by turning downward the finger piece $e'$ causing through the pressure of its stem $e$ upon the brake stem $d$ a sufficient frictional engagement of the brake shoe $g'$ with the rounded hinge tongues or disks of the compass arms, to hold the latter against accidental or voluntary movement. In this manner it will not only be seen that simple and reliable means are provided for retaining the compass arms in any desired position, but that the means employed are such as to present so slight a change in the appearance of the compass as to be scarcely noticeable. It will also be observed that the ordinary forms of compasses or similar drawing instruments may be readily provided with my improved brake at a reasonable expense and that said improvement will be of great utility and particularly where compass joints have worn or worked loose.

Having now fully described my invention, what I claim, and desire to secure by Letters Patent, is—

In a drawing instrument the combination with a compass or similar drawing instrument consisting of jointedly connected arms, a handle yoke embracing the head thereof as described, a central threaded opening in said yoke head and a finger piece adjustably engaging with said threaded opening, of a brake shoe interposed between said yoke head and compass head and a stem on said brake shoe projecting within said yoke head opening as described, substantially as and for the purpose specified.

HARRISON COLE.

In presence of—
A. W. SHIELDS,
H. B. BRADSHAW.